United States Patent
Dimasi

[19]

[11] Patent Number: 6,062,657
[45] Date of Patent: May 16, 2000

[54] BRAKE FAILURE COMPENSATION SYSTEM AND METHOD

[75] Inventor: Fred J. Dimasi, Bethel Park, Pa.

[73] Assignee: DaimlerChrysler Rail Systems (North America) Inc., Pittsburgh, Pa.

[21] Appl. No.: 09/063,532

[22] Filed: Apr. 21, 1998

[51] Int. Cl.[7] ...................................................... B60T 8/88
[52] U.S. Cl. ........................................ 303/122.13; 303/3
[58] Field of Search ............................... 303/3, 15, 128, 303/132, 135, 122.13

[56] References Cited

U.S. PATENT DOCUMENTS

| | | |
|---|---|---|
| 3,844,624 | 10/1974 | Jones . |
| 3,887,239 | 6/1975 | Engle . |
| 4,163,586 | 8/1979 | Snyder . |
| 4,671,577 | 6/1987 | Woods et al. ................................ 303/3 |
| 4,768,840 | 9/1988 | Sullivan et al. . |
| 4,804,234 | 2/1989 | Gee et al. . |
| 4,804,237 | 2/1989 | Gee et al. . |
| 4,962,969 | 10/1990 | Davis ............................................ 303/3 |
| 5,053,964 | 10/1991 | Mister et al. . |
| 5,293,966 | 3/1994 | Chareire . |
| 5,322,352 | 6/1994 | Ohno et al. .................................. 303/3 |
| 5,492,192 | 2/1996 | Brooks et al. ........................... 180/165 |
| 5,511,859 | 4/1996 | Kade et al. . |
| 5,707,115 | 1/1998 | Bodie et al. ................................. 303/3 |

*Primary Examiner*—Robert J. Oberleitner
*Assistant Examiner*—Melanie Talavera
*Attorney, Agent, or Firm*—Webb Ziesenheim Logsdon Orkin & Hanson, P.C.

[57] ABSTRACT

A system and method for providing braking to a vehicle having at least two brake sets intended to deliver braking forces for a decelerating rate in response to a braking force request wherein each brake set has surplus braking available. In the event one brake set fails or becomes unavailable, then the surplus available in the other braking set may be utilized to satisfy this deficit, thereby providing the requested braking rate to the vehicle.

20 Claims, 6 Drawing Sheets

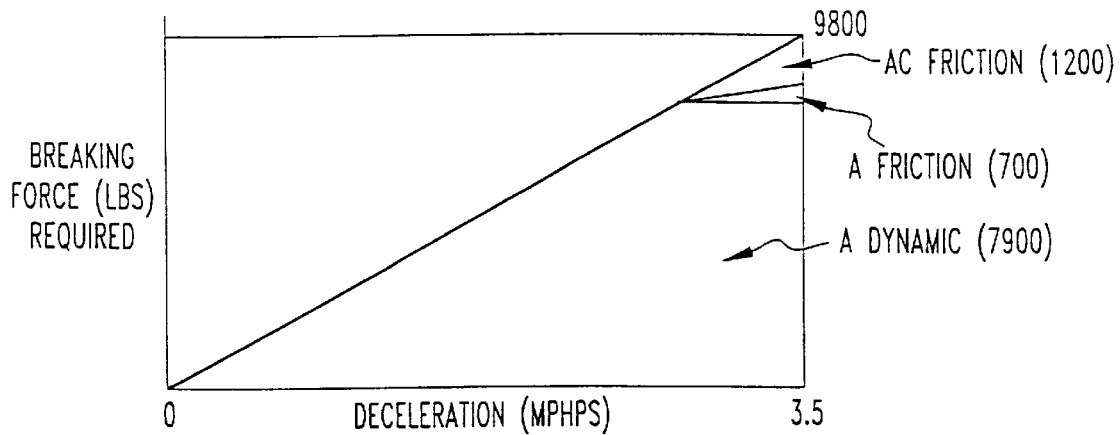
FIG.2   NORMAL SERVICE
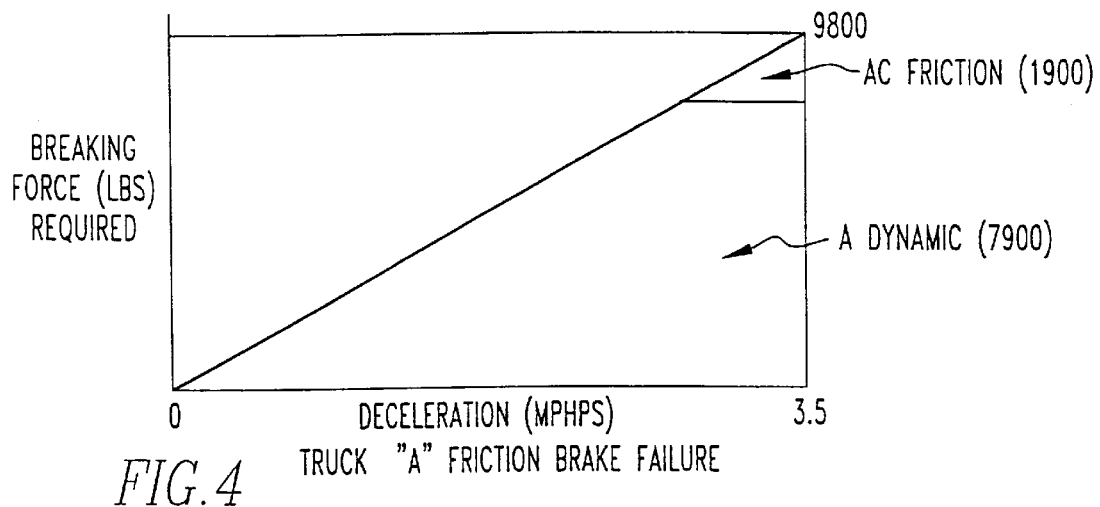
FIG.4   TRUCK "A" FRICTION BRAKE FAILURE
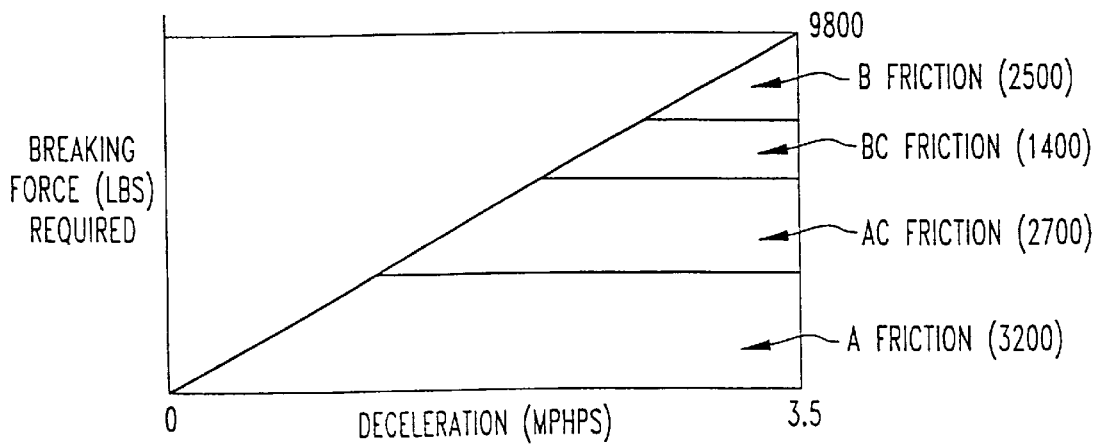
FIG.5   TRUCK "A" DYNAMIC BRAKE FAILURE

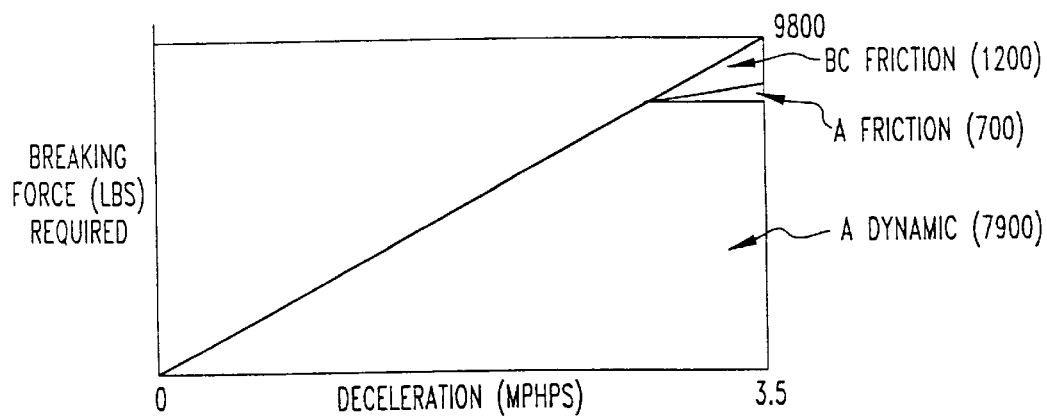
FIG. 6  AC FRICTION BRAKE FAILURE
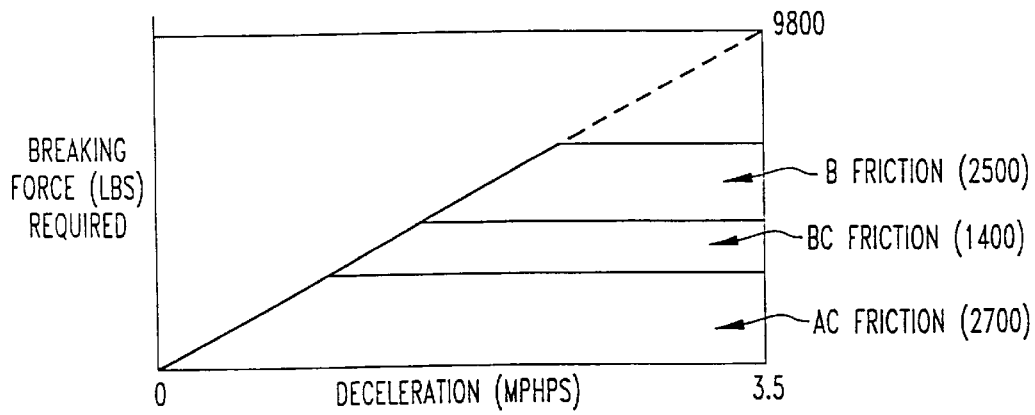
FIG. 7  TRUCK "A" DYNAMIC BRAKE AND FRICTION BRAKE FAILURE
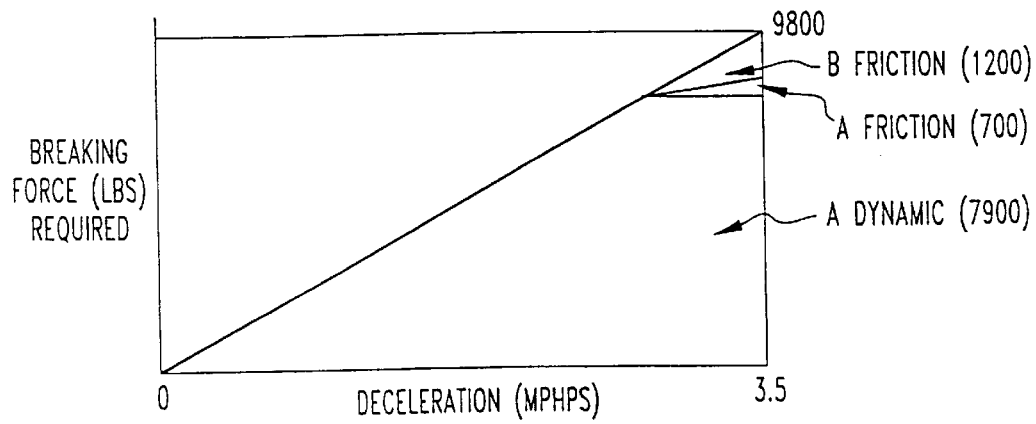
FIG. 8  AC/BC FRICTION BRAKE FAILURE

BRAKE FAILURE COMPENSATION SYSTEM AND METHOD

BACKGROUND OF THE INVENTION

1. Field of the Invention

This invention relates to a brake system for vehicles in which compensation for failure of one brake set may be provided by utilizing surplus braking capacity of another brake set.

2. Background of the Prior Art

With current designs for low-floor light rail vehicles (LRVs), space beneath each vehicle is at a premium. As a result, the friction brakes on these vehicles, which in the past were large enough to provide any braking the vehicle required, must be reduced in size to accommodate the now limited space beneath the vehicle and, therefore, must be underrated. LRVs typically have dynamic brakes which operate using the same motor that would propel the vehicle, and these brakes are used in conjunction with the friction brakes to decelerate the vehicle, thereby providing to the vehicle multiple brake sets.

However, since the friction braking alone cannot directly replace a loss of the dynamic braking, a brake failure compensation system is needed. This system will detect a loss of braking force in one brake set and attempt to compensate for that loss by passing the quantity of lost braking to another functional brake set which has surplus braking capacity. In this manner the vehicle may be decelerated at a desired rate despite the failure of a brake set.

U.S. Pat. No. 3,887,239 to Engle teaches a method for controlling the speed of a vehicle, such as a railway train, by applying a friction brake signal upon a command for braking. While a friction brake may be modulated to supplement an existing dynamic brake, this patent does not address compensation for brake failure but is directed toward controlling operational braking units thereby adjusting them to prevent or minimize wheel skidding.

U.S. Pat. No. 5,511,859 to Kade et al. discloses a dynamic and friction brake blend control system which consists of hydraulic friction brakes and a dynamic electric motor drive. The dynamic braking is blended with the hydraulic braking to achieve the desired braking; however, there is no discussion of compensating for the failure of any one brake.

A system is needed which is capable of utilizing the surplus capacity of the remaining operating brake sets in the event of the failure of one or more other brake sets.

SUMMARY OF THE INVENTION

A method is provided for supplying braking to a vehicle having at least two brake sets intended to deliver braking forces for a decelerating rate in response to a braking force request comprising the steps of directing the entire braking force request to a first brake set which, when fully functional, is capable of providing all requested deceleration rates, determining the braking force actually provided by the first brake set, directing any deficit in brake force not satisfied by the first brake set to remaining brake sets.

A brake system for a vehicle is also provided comprising at least two brake sets intended to deliver braking forces for specific deceleration rates upon receiving a braking force request, whereby the first brake set, when fully operational, is capable of providing all braking forces to the vehicle, and further comprising a controller which directs the entire braking force request to the first brake set; determines the braking force actually provided by the first brake set; and directs any deficit in brake force not satisfied by the first brake set to remaining brake sets.

A brake system is also provided for a vehicle having two cars, an A car and a B car, each car articulately connected to the other, comprising an A truck brake set attached to and dedicated to the A car; a B truck brake set attached to and dedicated to the B car; a C truck brake set attached to both the A car and the B car. The brake system is further comprised of two brake subsets AC and BC, with the AC brake subset dedicated to the A car and the BC brake subset dedicated to the B car and a controller which directs the entire braking force required for the A car to the A truck brake set and to the AC brake subset, directs the entire braking force for the B car to the B truck brake set and to the BC brake subset and determines the braking force provided by the A truck brake set and the AC brake subset and distributes any brake deficit to the BC brake subset associated with the B car and then to the remaining brakes associated with the B car brake set.

BRIEF DESCRIPTION OF THE DRAWINGS

FIG. 2 illustrates a braking allocation graph for normal service brake braking;

FIG. 4 illustrates a brake allocation graph when the friction brake on the A truck fails;

FIG. 5 illustrates a brake allocation graph when the dynamic brake on the A truck fails;

FIG. 6 illustrates a brake allocation graph when the AC friction brake on the C truck fails;

FIG. 7 illustrates a brake allocation graph when the friction brake and the dynamic brake associated with the A truck fail; and FIG. 8 illustrates a brake allocation graph when both friction brakes on the C truck fail.

DETAILED DESCRIPTION OF THE EMBODIMENTS

Figure 1:
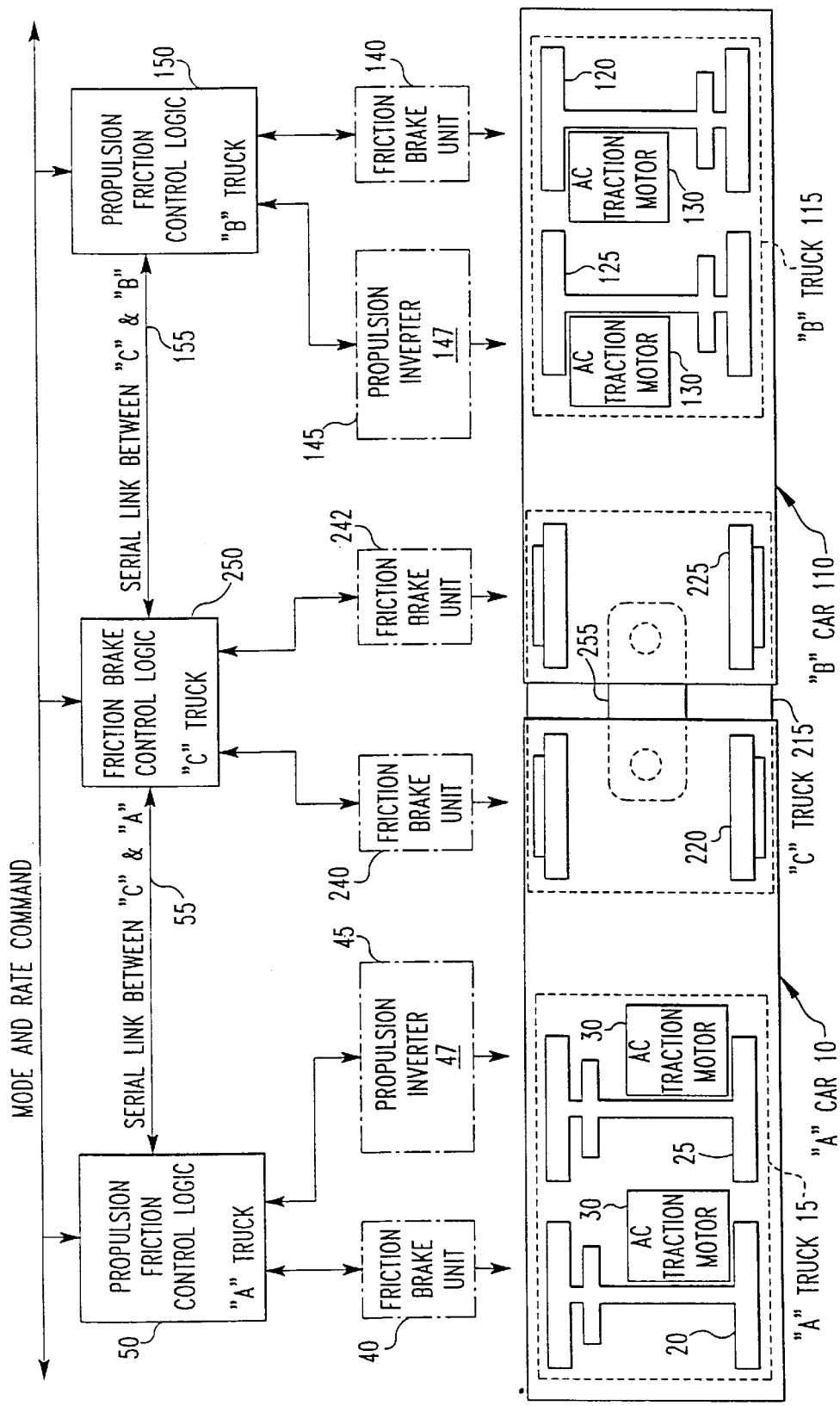
FIG. 1 illustrates a schematic showing the architecture of the braking system in accordance with the subject invention.

While the brake system described herein may be applied to any number of vehicles, a light rail vehicle (LRV) will be used as an example throughout this discussion. The typical light rail vehicle is an articulated design consisting of two cars, A car and B car, indicated in the schematic drawing of the architecture of the braking system shown in FIG. 1 by reference numerals 10 and 110, respectively. Associated with each of the A car and the B car is an A truck 15 and a B truck 115. Mounted upon each of these trucks are pairs of wheels 20, 25 and 120, 125 which may be driven by motors 30, 130, which may be alternating current traction motors. Also associated with the A truck 15 and the B truck 115 are friction brakes 40 and 140 which are mounted to the A truck 15 and B truck 115 along with dynamic brakes 45, 145 which utilize the motors 30, 130 using propulsion inverters 47, 147 to act as brakes. In this fashion, the A truck 15 has associated with it a friction brake 40 and a dynamic brake 45, referred to as brake subsets within the A truck brake set, while the B truck 115 has associated with it a friction brake 140 and a dynamic brake 145 referred to as brake subsets within the B truck brake set.

The A truck 15 brakes are controlled by an A truck brake control unit (BCU) 50, just as the B truck 115 brakes are controlled by the B truck brake control unit (BCU) 150.

The A truck 15 and the B truck 115 share a common C truck designated as 215. The C truck is made up of two pairs of wheels 220, 225 which may be associated with brake systems or may be individual pairs of wheels unrestrained by a braking system. For purposes of this invention, each pair of wheels 220, 225 has associated with it a friction brake 240, 242. Each of these brakes 240, 242 is controlled by the C truck brake control unit (BCU) 250; however, the brake 240 is associated with the A car and the brake 242 is associated with the B car. Therefore, these brakes will be referred to as the AC and BC friction brakes, respectively. These brakes are brake subsets within the C truck brake set.

The C truck 215 is pivotally attached to the A truck 15 and to the B truck 115 to provide an articulated arrangement between the A truck 15 and the B truck 115 through a pivoting link 255.

In general, a tractive effort required to decelerate the vehicle is provided by a mixture of dynamic braking and friction braking on the A truck and the B truck plus friction braking from the C truck. As an example, FIG. 2 illustrates a brake allocation graph for normal service braking for the A car. To decelerate the A car when fully loaded at the maximum design weight, it is necessary to provide approximately 9900 pounds of brake force to the A car. To do so, a typical allocation would be approximately 7900 pounds to the A truck dynamic brake, about 700 pounds to the A truck friction brake, and about 1200 pounds to the AC friction brake. It should be noted that, under normal service, priority is given to the dynamic brake since it has the greatest capacity and furthermore it encounters the least amount of wear. Therefore, the dynamic brake is always used first to its maximum capacity when the vehicle is traveling fast enough for the brake to be effective (>3 mph). However, it should also be noted that the A truck friction brake and the AC friction brake each have a built-in design surplus such that the A truck friction brake may provide a force of up to approximately 6700 pounds and the AC friction brake may provide a force of up to approximately 3100 pounds.

The B car has the same surplus braking, and it may therefore be appreciated that in the event a brake failure occurs on either the A car or the B car, it is entirely possible that the surplus which exists in the remaining operative braking systems of either car might be utilized to compensate for any deficit caused by a brake failure.

In operation, based upon the weight of the A car and the deceleration request, a required braking force is calculated for the entire A car by each of the A truck BCU and the C truck BCU. The A truck attempts to independently satisfy this required brake force and any deficit is detected by the C truck BCU and transmitted to the C truck AC brake.

In some instances, the operational brakes associated with an individual car may satisfy the brake force request when one brake subset fails, without the need to use brake sets associated with the other car. As an example, FIG. 4 illustrates a brake allocation graph in which the A truck friction brake has failed, thereby creating a deficit of about 700 pounds in braking force. The built-in surplus available in the AC friction brake may be utilized to compensate for this deficit such that the brake sets associated with the A car may absorb this deficit. When any brake set fails, the brake control unit associated with that set will first attempt to compensate for the deficit created by using any surplus available in the brake subsets within that brake set.

However, there are situations in which a brake subset failure will deplete any surplus available within a brake set and, as a result, additional braking must be provided by other braking sets to provide sufficient braking force for the requested deceleration.

In these instances, the brake failure compensation system of the subject invention transfers the surplus available in other brake sets to compensate for the deficit created by the failure of a subset.

Returning to FIG. 1, a serial link 55 exists between the A truck BCU 50 and the C truck BCU 250 while a second serial link 155 exists between the B truck BCU 150 and the C truck BCU 250. These serial links 55, 155 allow communication between the C truck BCU and the A truck BCU and between the C truck BCU and the B truck BCU. In this manner, the C truck BCU is able to monitor the activity of the A truck, B truck and C truck and to attempt to compensate for any brake deficit within these trucks.

Figure 3A:
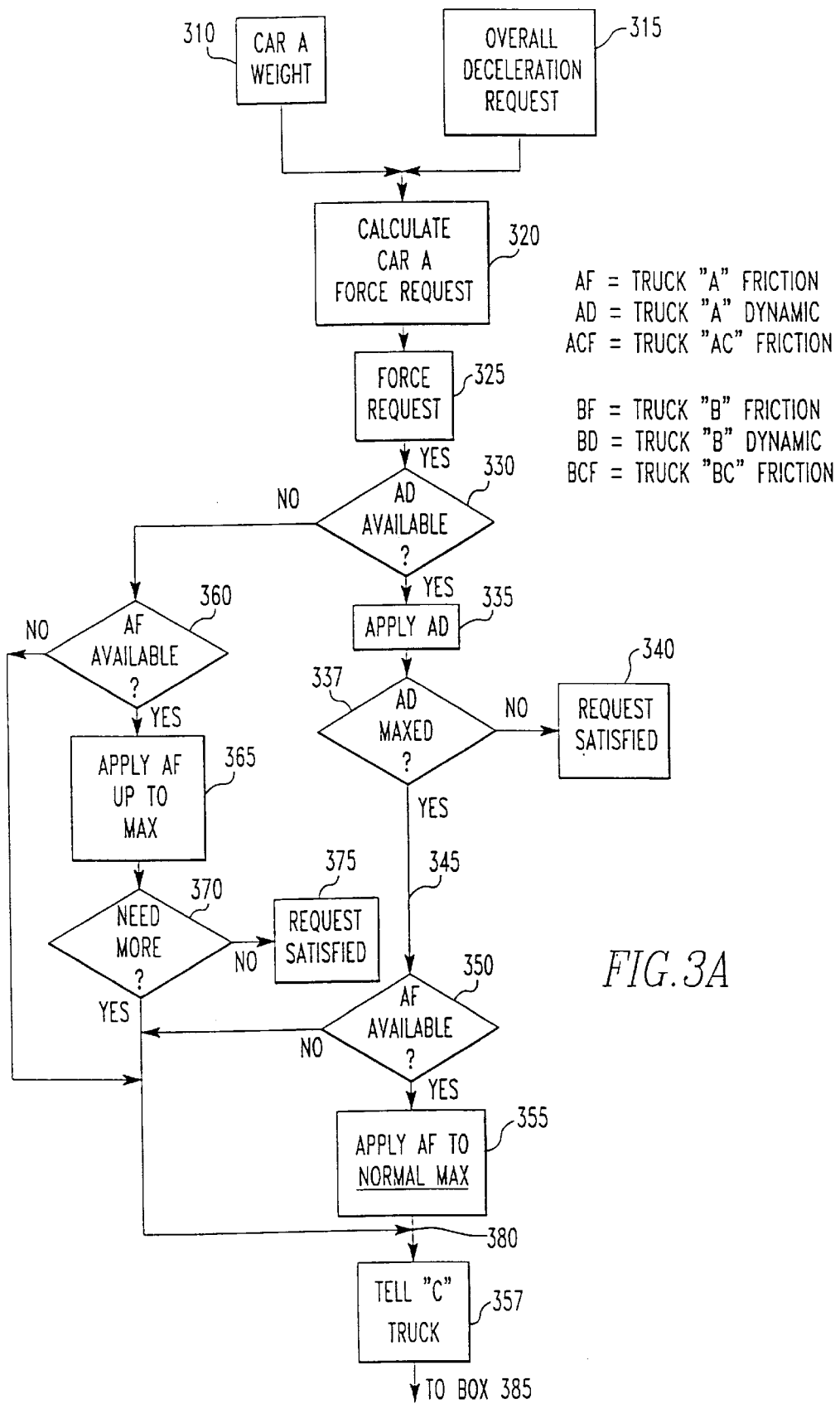
FIGS. 3A–3C illustrates a flow chart showing the logic when a brake set associated with the A car fails.
Figure 3B:
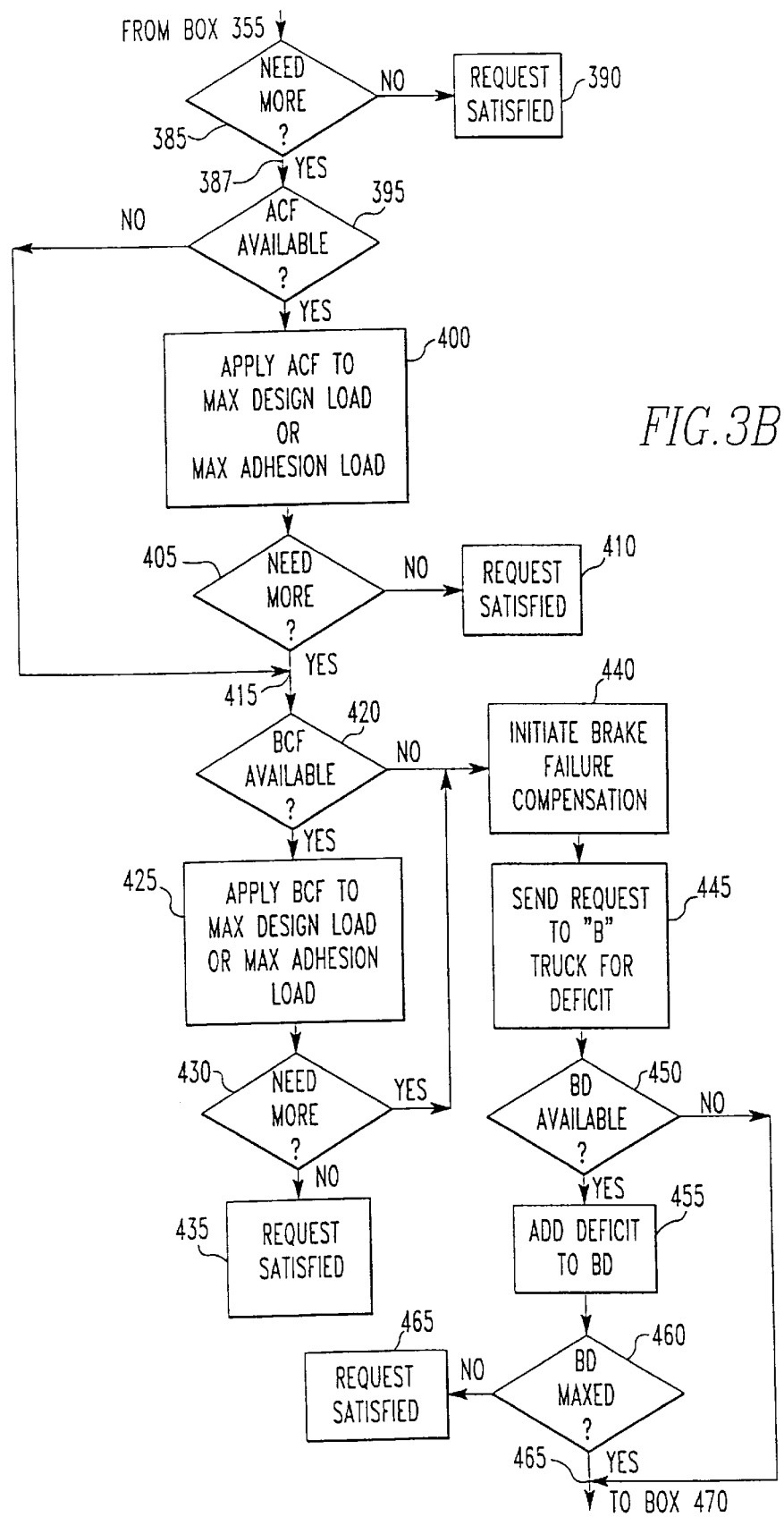
Figure 3C:
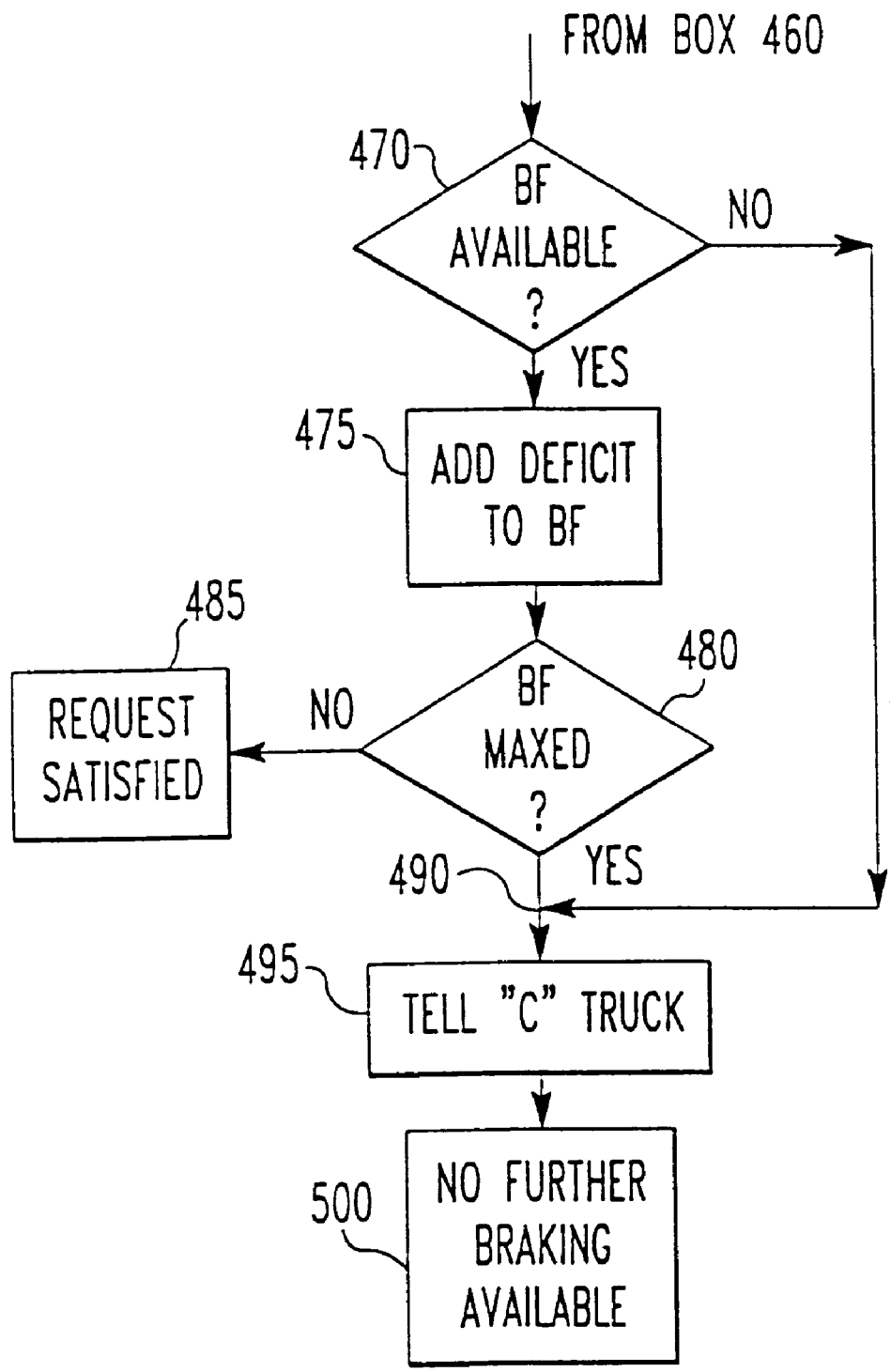

FIGS. 3A–3C illustrate a flow chart with the logic of first the A truck BCU and then the C truck BCU in the event the brake force request for the A truck cannot be satisfied by the brake set associated with the A truck. Given the A car weight (310) and the deceleration request for the A car (315), an A car force request (320) is calculated to provide a force request (325). It should be noted that the dynamic brake is most effective when the vehicle is traveling at a speed of over three miles per hour, and below that speed the effectiveness diminishes and the importance of the friction brake increases. At speeds below three miles per hour but above one mile per hour, the dynamic brake diminishes proportionately to the speed until at one mile per hour the dynamic brake no longer contributes to the braking forces and all braking is accomplished with the exclusive use of the friction brakes. However, for purposes of this discussion, it will be assumed the vehicle is traveling greater than three miles per hour such that if the dynamic brake is available, its full capacity is available.

The A truck BCU determines whether or not the A truck dynamic brake (designated as AD) (330) is available. If the dynamic brake is available, then the dynamic brake is applied (335) until the brake force request is satisfied (340) or until the dynamic brake is applied to its capacity (337) such that it may provide no further braking (345). At this point, if the friction brake of the A truck is available (350), it is applied to its normal maximum load (355), since no circumstances have yet indicated any brake failure. This information is then transferred to the C truck BCU (357).

However, if the A truck dynamic brake is not available (330), assistance from the A truck friction brake is sought. If the brake is available (360), then the A truck friction brake is applied up to the maximum permissible load (365). If this load is sufficient to satisfy the requested force (370), then no further action is taken (375). If, however, this is insufficient to satisfy the requested load, then more braking force is needed and the logic merges with point (380) on the flow chart.

If the A truck dynamic brake is available (330) and applied to its maximum load (345) without satisfying the brake force request but the A truck friction brake is unavailable (350), then the logic again merges with point (380) on the flow chart. At this point the dynamic brake and the friction brake of the A truck have been activated and responded in a manner typical of normal operation as illustrated by path (330, 337, 350 and 355) or, in the alternative, failure has occurred with the A truck friction brake and compensation has been attempted, as illustrated by path (330, 360 and 370). Nevertheless, no further brake surplus is available from the A truck friction brake or the A truck dynamic brake, and any deficit which now exists must be satisfied through one of the other brake sets. In the event the brake force is tested (385) and no additional force is required (390), then the request has been satisfied. If, however, additional brake force is required (387), then the A portion of the C truck friction brake (395) is sought. If this friction brake is available, then it is applied to the maximum design load of this brake or to the maximum adhesion load permitted. Typically, the maximum permissible adhesion load for the A truck and for the B truck is less than half of the load applied by the dynamic brake on the respective truck and is preferably about 40% of that dynamic brake load. There is no limit placed upon the friction brake for a maximum adhesion load when the dynamic brake is not operating.

The load is then tested (405) and, if it is sufficient, the request is satisfied (410) with no further action. However, if additional force is required, further processing is necessary (415).

Furthermore, if upon testing the friction brake of the C truck (395) and it is unavailable, then further action (415) is also needed. At this point the friction brake on the C truck associated with the B car may be utilized (420) to address any deficits. Just as with the C truck friction brake associated with the A car, the C truck friction brake associated with the B car may be applied to the maximum design load or the maximum adhesion load (425). If this load is sufficient (430), then the request is satisfied and no further action is required (435). If, however, the C truck friction brake associated with the B car is unavailable (420) or is incapable of supplying a load sufficient to satisfy the request (430), then brake failure compensation is initiated (440) to use any surplus braking that may be available from the B truck braking set.

A request is transmitted to the B truck for such a deficit (445). While the B truck may fulfill such a deficit using either the dynamic brake or the friction brake of the B truck, just as with the A truck, priority is given to utilizing the dynamic brake to its maximum before implementing use of the friction brake. If the dynamic brake on the B truck is available (450), then the deficit of the brake load is added to the dynamic brake (455). If the dynamic brake has sufficient surplus (460) to meet the deficit, then the request is satisfied (465) and no further action is required. However, if it does not, further action is required. If the dynamic brake on the B truck is unavailable (450), then the logic transfers to point (465) for further processing.

Now an attempt is made to utilize any deficit which may exist on the friction brake of the B truck (470). If the friction brake is available, then the deficit is added to the friction brake (475) until the friction brake reaches a maximum value (480) or until the request is satisfied (485). At this point the logic has progressed to point (490).

If, however, the friction brake on the B truck is unavailable (470), then the logic progresses to point (490) and the C truck is informed that a deficit still exists (495). At that point no further braking is available (500) and the maximum deceleration the car may experience will be limited by the maximum available braking force.

Examples illustrating different modes of brake failure of brake sets associated with the A car are shown in FIGS. 4 through 7. As a general guideline in illustrating these failures, the values found below are the maximum normal operating forces and the maximum design forces each brake subset may provide.

CHART A

|  | Normal Maximum Operating Force (lb$_f$) | Maximum Design Force (lb$_f$) |
|---|---|---|
| A Truck Friction | 700 | 3200 |
| A Truck Dynamic | 7900 | 7900 |
| B Truck Friction | 700 | 3200 |
| B Truck Dynamic | 7900 | 7900 |
| C Truck Friction "A" | 1200 | 2700 |
| C Truck Friction "B" | 1200 | 2700 |

As previously discussed, FIG. 4 illustrates the brake allocation when the friction brake in the A truck fails. To decelerate a fully loaded A car at a specified deceleration rate, a force of 9800 lbs. is required. Returning to the flow chart in FIG. 3, as illustrated in step (330), the dynamic brake is available and, therefore, may be applied to its maximum value of 7900 lbs. While the friction brake associated with the A truck is unavailable (350), the friction brake in the C truck associated with the A car is available (395) and may be applied to satisfy the deficit created by the disabled friction brake in the A truck in the amount of approximately 1900 lbs.

FIG. 5 illustrates the brake allocation when the dynamic brake of the A truck fails. Returning to the FIG. 3 flow chart, with the A truck dynamic brake unavailable (330), the friction brake associated with the A truck is available (360) such that it is applied to its maximum force (365) of 3200 lbs. Since the brake requested force is 9800 lbs., this is still insufficient and, as a result, the friction brake in the C truck associated with the A car is available (395) and is applied to the maximum adhesion load (400) of 2700 lbs. This is still insufficient to satisfy the brake force request, and since the friction brake on the C truck associated with the B car is available (420), that brake is also applied to its maximum adhesion load (425) of approximately 2700 lbs. However, a portion of this force has already been allocated to the deceleration of the B car and, as a result, only approximately 1400 lbs. is available to assist in the deceleration of the A car.

Therefore, the brake failure compensation (440) is initiated and the friction brake in the B car is employed (470, 475) to supply approximately 2500 lbs. which is sufficient to satisfy the brake request for the A car.

It should be noted that the dynamic brake in the B truck is available, however, has been fully utilized to decelerate the B car and, therefore, is unavailable to satisfy any deficit encountered by the A car.

FIG. 6 illustrates the allocation of braking when the friction brake on the C truck associated with the A car fails. In this situation, since the two brake subsets on the A truck are operating and available, then these two brake subsets are utilized to their normal service levels which, for the A truck dynamic brake, is 7900 lbs. and for the A truck friction brake is 700 lbs. The friction brake on the C truck associated with the A car is then employed to provide the remaining 1200 lbs. This would be illustrated in steps (330, 337, 350, 395, 405) and (410) of the flow chart illustrated in FIG. 3.

FIG. 7 illustrates an allocation of braking in the instance of failure of both the friction brake and the dynamic brake associated with the A truck. Under those circumstances, following the flow chart in FIG. 3, without the dynamic brake of the A truck (330) and without the friction brake of the A truck (360) available, the friction brake on the C truck associated with the A car (395) will be employed to the maximum adhesion load (400) of 2700 lbs. and the friction brake on the C truck associated with the B car will be applied to its maximum adhesion load (425), thereby contributing 1400 lbs. to the deficit of the A car. Brake failure compensation (440) will be initiated such that the friction brake associated with the B car (470) will be employed to its maximum available surplus of 2500 lbs. It should be noted that the friction brake on the C truck associated with the B car actually provides a braking force of 2700 lbs. and the friction brake on the B truck actually provides a braking force of 3200 lbs. However, a part of these forces is utilized to decelerate the B car.

As seen in FIG. 7, a brake force of 9800 lbs. is requested to decelerate the A car. However, only a brake force of 6600 lbs. is available, and for that reason the maximum deceleration rate cannot be met in the event the friction brake and dynamic brake associated with the A car fail.

FIG. 8 illustrates the brake allocation when the friction brakes associated with the C truck fail. Since there is a simultaneous failure of a brake subset associated with the A car and a brake subset associated with the B car, but the brakes associated with the A truck and the B truck are functional and available, then the deficit created by the failure of the friction brake on the C truck associated with the A car is transferred to the brakes on the B truck. Although there is no surplus available from the dynamic brake on the B truck, there is a surplus available from the friction brake on the B truck, and that brake applies approximately 1900 lbs., of which 1200 lbs. is the deficit passed from the C truck on behalf of the failed friction brake associated with the A car. In the same fashion, the deficit created by the failure of the friction brake on the C truck associated with the B car is passed to the A truck A braking sets and a similar resolution is provided there.

What has been discussed so far are scenarios which utilize the braking system to decelerate, at a desired rate, a fully loaded car traveling at a speed greater than three miles an hour such that the dynamic brakes may be employed to their full capacity. Under these circumstances, by design, the friction brakes are not used to their capacity since the dynamic brake can take a large portion of the braking force and, furthermore, it is desirable to avoid unnecessarily using the friction brakes at high speeds because they wear out and would have to be replaced more frequently. At speeds below three miles an hour, the dynamic brakes become less efficient, and below one mile an hour are not used at all in favor of the friction brakes.

Furthermore, the braking force on the C truck is limited by the maximum adhesion load available to the brakes on the C truck. At above three miles an hour by design, the braking force applied by all of the brakes on the C truck is not permitted to exceed 15% of the weight on that truck from the A car and the B car. Below three miles an hour, this amount is increased to 18%.

FIGS. 4–8 illustrate maximum operating conditions of the A car, and it should be appreciated that in most situations these maximum conditions will not exist and, as a result, each operational braking set will have surplus available such that in the event one or more other brake sets are not operational, there will be ample surplus to satisfy any deficits. As a result, situations such as that illustrated in FIG. 7 in which a brake load sufficient to satisfy the desired deceleration rate was unavailable will occur only rarely.

What has been described as a brake failure compensation system and method utilizing a plurality of brake subsets such that the braking set created by the failure of one or more subsets may readily be absorbed by the surplus available in the remaining braking subsets, thereby permitting a vehicle to brake at the requested deceleration rate even with one or more braking subsets unavailable.

Although this invention has been described with references to a specific embodiment thereof, numerous modifications are possible without departing from the invention, and it is desirable to cover all modifications falling within the spirit and scope of this invention.

I claim:

1. A method for providing braking to a vehicle having a first car and a second car articulately connected to one another and having three brake sets intended to deliver braking forces based upon a deceleration rate request which is used to generate a brake force request for the first car and a brake force request for the second car, wherein a first brake set is dedicated to the first car, a second brake set is dedicated to the second car, and a third brake set is common to both the first car and the second car, comprising the steps of:
   a) directing the braking force request for the first car to the first brake set,
   b) determining the braking force actually provided by the first brake set,
   c) directing any deficit in the braking force request for the first car not satisfied by the first brake set to the common third brake set,
   d) determining the braking force actually provided by the first brake set and the common third brake set to the first car, and
   e) directing any deficit in the braking force request for the first car not satisfied by the first brake set and the common third brake set to the second brake set.

2. The method according to claim 1 wherein the deficit is sequentially passed to each remaining braking set until such a deficit is satisfied or until all available sets are utilized.

3. The method according to claim 1 wherein a first brake set is comprised of a dynamic brake.

4. The method according to claim 3 wherein a second brake set has a brake capacity less than the braking force required to provide a desired deceleration rate at normal operating speeds.

5. The method according to claim 4 wherein the second brake is a friction brake.

6. The method according to claim 5 wherein the force applied by the friction brake is limited to less than half of the force applied to the dynamic brake.

7. A brake system for a vehicle comprising:
   a) at least two brake sets intended to deliver braking forces for specific deceleration rates upon receiving a braking force request whereby the first brake set, when fully operational, is capable of providing all braking forces to the vehicle,
   b) a controller which:
      1) directs the entire braking force request to the first brake set;
      2) determines the braking force actually provided by the first brake set;
      3) directs any deficit in braking force not satisfied by the first brake set to the remaining brake sets; and
   c) wherein one brake set has a first and second brake subset and the controller directs the braking force for that set to the first brake subset and then to the second brake subset.

8. The brake system according to claim 7 wherein the first brake subset is a dynamic brake and a second brake subset is a friction brake.

9. The brake system according to claim 8 wherein the friction brake subset has a brake capacity less than the braking force required to provide a desired deceleration rate at normal operating speeds.

10. The brake system according to claim 9 wherein the friction brake subset provides a brake force of less than one-half that force provided by the dynamic brake subset.

11. The brake system according to claim 7 wherein the second brake set is comprised of two friction brakes.

12. The brake system according to claim 11 further including a third brake set comprised of at least one dynamic brake.

13. A brake system for a vehicle having an A car and a B car, each car articulately connected to the other, comprising:
   a) an A truck brake set attached to and dedicated to the A car;
   b) a B truck brake set attached to and dedicated to the B car;
   c) a C truck brake set attached to both the A car and the B car and having two brake subsets AC and BC, with the AC brake subset dedicated to the A car and BC brake subset dedicated to the B car; and
   d) a controller which
      1) directs the entire braking force required for the A car to the A truck brake set and to the AC brake subset;
      2) directs the entire braking force for the B car to the B truck brake set and to the BC brake subset; and
      3) receives the value of the braking force provided by the A truck brake set and the AC brake subset and distributes a brake force request for any brake deficit to the BC brake subset associated with the B car and then to the remaining brakes associated with the B car brake set.

14. The truck brake system according to claim 13 wherein the A truck and the B truck each have a brake subset comprised of a dynamic brake.

15. The brake system according to claim 14 wherein the A truck and the B truck each have a second brake subset comprised of a friction brake.

16. The brake system according to claim 15 wherein the AC brake subset and the BC brake subset are each comprised of a friction brake.

17. The brake system according to claim 16 wherein the combined braking capacity of the friction brakes is less than the braking force required to provide all of the desired deceleration rate at normal operating speeds for the A car and the B car.

18. The brake system according to claim 15 wherein the force applied by the friction brake subset of either the A truck or the B truck is less than half of the force applied by the dynamic brake of that car.

19. The brake system according to claim 14 wherein the controller distributes any braking deficit in a hierarchal fashion giving first priority to the dynamic brakes.

20. A brake system for a vehicle having an A car and a B car, each car articulately connected to the other, comprising:
   a) an A truck brake set attached to and dedicated to the A car;
   b) a B truck brake set attached to and dedicated to the B car;
   c) a C truck brake set attached to both the A car and the B car, wherein the C truck brake set is common to both the A car and the B car and
   d) a controller which:
      1) directs the entire braking force required for the A car to the A truck brake set and to the C truck brake set;
      2) directs the entire braking force for the B car to the B truck brake set and to the C truck brake set; and
      3) receives the value of the braking force provided by the A truck brake set and the C truck brake set and distributes a braking force request for any brake deficit to the B truck brake set.

* * * * *